United States Patent
Kim

(10) Patent No.: US 12,504,085 B2
(45) Date of Patent: Dec. 23, 2025

(54) AIR MOBILITY VEHICLE WITH A FUEL CELL STACK AND A METHOD FOR CONTROLLING THE SAME

(71) Applicants: HYUNDAI MOTOR COMPANY, Seoul (KR); KIA CORPORATION, Seoul (KR)

(72) Inventor: Nam Sik Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 337 days.

(21) Appl. No.: 18/139,445

(22) Filed: Apr. 26, 2023

(65) Prior Publication Data

US 2024/0175504 A1 May 30, 2024

(30) Foreign Application Priority Data

Nov. 30, 2022 (KR) ........................ 10-2022-0164822

(51) Int. Cl.
| | |
|---|---|
| *F16K 17/36* | (2006.01) |
| *B60L 3/12* | (2006.01) |
| *B60L 50/70* | (2019.01) |
| *B64D 27/355* | (2024.01) |

(52) U.S. Cl.
CPC ............... *F16K 17/36* (2013.01); *B60L 3/12* (2013.01); *B60L 50/70* (2019.02); *B64D 27/355* (2024.01); *B60L 2200/10* (2013.01)

(58) Field of Classification Search
CPC . F16K 17/36; B60L 3/12; B60L 50/70; B60L 2200/10; B64D 27/24; B64D 27/355; B64D 41/00; B64D 2041/005; B64U 50/32; H01M 8/04619; H01M 8/04679; H01M 8/04761; Y02T 50/60
See application file for complete search history.

(56) References Cited

U.S. PATENT DOCUMENTS

| | | | | |
|---|---|---|---|---|
| 6,086,767 | A * | 7/2000 | Walters ................. | F04B 49/065 210/656 |
| 10,858,296 | B1 * | 12/2020 | Myrick .................. | C06B 45/04 |
| 2013/0252118 | A1 * | 9/2013 | Otto .................. | H01M 8/04694 429/414 |
| 2019/0363379 | A1 * | 11/2019 | Son .................... | H01M 8/04302 |
| 2020/0335806 | A1 * | 10/2020 | Zheng ............... | H01M 8/04761 |
| 2020/0398992 | A1 * | 12/2020 | Morrison ............... | B64U 50/19 |
| 2021/0331791 | A1 * | 10/2021 | Geuther ................. | B64C 39/08 |
| 2022/0052361 | A1 * | 2/2022 | Morrison .......... | H01M 8/04014 |
| 2022/0098744 | A1 * | 3/2022 | Mills ....................... | C25B 13/04 |

(Continued)

FOREIGN PATENT DOCUMENTS

KR 20150049155 A 5/2015

*Primary Examiner* — Donald J Wallace
*Assistant Examiner* — Jalal C Coduroglu
(74) *Attorney, Agent, or Firm* — Lempia Summerfield Katz LLC

(57) ABSTRACT

A fuel cell air mobility vehicle includes a fuel cell stack that provides power required for flight; a drain valve that discharges condensate generated through power generation of the fuel cell stack to an outside; and a controller that controls opening and closing of the drain valve based on a state of the power generation of the fuel cell stack, a flight state of an air mobility vehicle, a flight position of the air mobility vehicle, or a state of an external environment of the air mobility vehicle.

13 Claims, 3 Drawing Sheets

(56) References Cited

U.S. PATENT DOCUMENTS

| | | | |
|---|---|---|---|
| 2022/0166039 A1* | 5/2022 | Park | H01M 8/04462 |
| 2022/0200023 A1* | 6/2022 | Jung | H01M 8/04104 |
| 2022/0344685 A1* | 10/2022 | Okabe | B60L 58/33 |
| 2023/0067675 A1* | 3/2023 | Son | H01M 8/04156 |

* cited by examiner

AIR MOBILITY VEHICLE WITH A FUEL CELL STACK AND A METHOD FOR CONTROLLING THE SAME

CROSS REFERENCE TO RELATED APPLICATION

The present application claims the benefit of and priority to Korean Patent Application No. 10-2022-0164822, filed Nov. 30, 2022, the entire contents of which are incorporated herein by reference.

BACKGROUND

Field

The disclosure relates to an air mobility vehicle having a fuel cell stack (hereinafter "a fuel cell air mobility vehicle") and a control method of the air mobility vehicle. Specifically, the disclosure relates to a control of condensate discharge of an air mobility vehicle using a hydrogen fuel cell as a main power source.

Description of the Related Art

A fuel cell is a device that generates electrical energy through an electrochemical reaction inside a fuel cell stack by receiving hydrogen and air supplied from the outside. The fuel cell can be used as power sources in various fields, such as fuel cell vehicles (FCEVs) and fuel cells for power generation.

A fuel cell system includes a fuel cell stack in which a plurality of fuel cell cells used as a power source are stacked on one another. The fuel cell system also includes: a fuel supply system configured to supply the fuel cell stack with hydrogen or the like, which is a fuel; an air supply system configured to supply the fuel cell stack with oxygen, which is an oxidant required for an electrochemical reaction; and a water/heat management system configured to adjust the temperature of the fuel cell stack.

The fuel supply system decompresses compressed hydrogen in a hydrogen tank and supplies the decompressed hydrogen to the anode of the fuel cell stack, and the air supply system operates an air compressor to supply external air to the cathode of the fuel cell stack.

When hydrogen is supplied to the anode of the fuel cell stack and oxygen is supplied to the cathode, hydrogen ions are separated at the anode via a catalytic reaction. The separated hydrogen ions are transferred to an oxidation electrode, which is the cathode, through an electrolyte membrane, and at the anode, the hydrogen ions separated from the fuel electrode, electrons, and oxygen cause an electrochemical reaction, through which electrical energy can be obtained. In particular, an electrochemical oxidation of hydrogen occurs at the anode, and an electrochemical reduction of oxygen occurs at the cathode, and electricity and heat are generated due to the movement of electrons generated in this procedure, and vapor or water is generated due to a chemical reaction in which hydrogen and oxygen combine.

An exhaust device is provided to discharge hydrogen and oxygen that are not reacted, and by-products such as vapor, water, and heat generated during the electrical energy generation process of the fuel cell stack. The gases such as the vapor, hydrogen and oxygen are discharged into the atmosphere through an exhaust passage.

The electrochemical reaction occurring inside the fuel cell is represented by the reaction formula as follows.

[Reaction at an anode] $2H_2 (g) \rightarrow 4H^+ (aq.) + 4e^-$

[Reaction at a cathode] $O_2 (g) + 4H^+ (aq.) + 4e^- \rightarrow 2H_2O (l)$

[Overall reaction] $2H_2 (g) + O_2 (g) \rightarrow 2H_2O (l) + $ Electrical energy + Heat energy As shown in the above reaction formula, a hydrogen molecule is dissociated and generated into four hydrogen ions and four electrons at the anode. The generated electrons move through an external circuit to generate current (electrical energy), and the generated hydrogen ions move to the cathode through an electrolyte membrane to perform a reduction electrode reaction, and water and heat are produced as by-products of the electrochemical reaction.

Meanwhile, the condensate generated in the fuel cell stack is discharged through an anode-side drain valve. In the case of a fuel cell vehicle, the condensate can be discharged to the outside at all times while driving, but in the case of an air mobility vehicle, the condensate must be discharged in a location where a human activity level is low such as mountains and seas, not downtown areas.

The statements in this section merely provide background information related to the present disclosure and may not constitute prior art.

SUMMARY

The present disclosure provides a fuel cell air mobility vehicle which enables smooth discharge of condensate, smooth air mobility vehicle operation over the city center, and efficient discharge of condensate, thereby improving fuel efficiency and driving performance of a fuel cell air mobility vehicle. and a control method of a fuel cell air mobility vehicle.

In one embodiment of the present disclosure, a fuel cell air mobility vehicle includes: a fuel cell stack that provides power required for flight of the fuel cell air mobility vehicle; a drain valve that discharges condensate generated by power generation of the fuel cell stack to an outside; and a controller that controls opening and closing of the drain valve based on a state of the power generation of the fuel cell stack, a flight state of the air mobility vehicle, a flight position of the air mobility vehicle, or a state of an external environment of the air mobility vehicle.

The controller may set a drain level based on the state of the power generation of the fuel cell stack.

The state of the power generation of the fuel cell stack may include an amount of the condensate generated by the power generation of the fuel cell stack or a power consumption of a fuel cell stack accessary (BoP).

The controller may set a drain level through a factor according to the amount of condensate generated by the power generation of the fuel cell stack or the consumption power of the fuel cell stack accessory (BoP).

The controller may divide the drain level into n steps.

The controller may increase an amount of the condensate discharged by increasing a degree of opening of the drain valve as the drain level increases.

The controller may set the drain level by multiplying a factor according to a current flight mode of the air mobility vehicle with a factor according to an amount of the condensate.

The controller may determine an emergency situation if the set drain level is higher than or equal to a predetermined value and opens the drain valve to discharge the condensate to the outside.

When the emergency situation is determined, the controller may change a flight speed or flight altitude for drain of the condensate.

The controller may control the opening and closing of the drain valve in consideration of the drain level, the flight state of the air mobility vehicle, the flight position of the air mobility vehicle, or the state of the external environment of the air mobility vehicle if the set drain level is less than a predetermined value.

The flight state of the air mobility vehicle may include a speed of the air mobility vehicle or a flight altitude of the air mobility vehicle. The controller may control the opening and closing of the drain valve based on at least one of the drain level, the speed of the air mobility vehicle or the flight altitude of the air mobility vehicle.

When the speed of the air mobility vehicle or the flight altitude of the air mobility vehicle is higher than or equal to a predetermined value, the drain valve may be opened to discharge the condensate to the outside regardless of the flight position of the air mobility vehicle or the state of the external environment of the air mobility vehicle.

The state of the external environment of the air mobility vehicle may include whether or not there is precipitation outside the air mobility vehicle. When the controller determines that there is the precipitation outside the air mobility vehicle, the controller may open the drain valve to discharge the condensate to the outside regardless of the flight state of the air mobility vehicle or the flight position of the air mobility vehicle.

The flight position of the air mobility vehicle may include a position where the condensate is able to be discharged to the outside. When a current position of the air mobility vehicle is determined as the position where the condensate is able to be discharged to the outside, and a discharge time according to an amount of condensate is shorter than a time to leave the position where the condensate is able to be discharged, the controller may open the drain valve to discharge the condensate to the outside.

A method for controlling the above fuel cell air mobility vehicle includes: identifying, by the controller, the state of the power generation of the fuel cell stack; identifying, by the controller, the flight state of the air mobility vehicle; identifying, by the controller, a flight position of the air mobility vehicle; identifying, by the controller, the state of the external environment of the air mobility vehicle; and determining, by the controller, whether the drain valve is opened or closed.

According to the fuel cell air mobility vehicle and control method of the fuel cell air mobility vehicle of the disclosure, it is possible to discharge condensate smoothly, operate the air mobility vehicle smoothly in the sky over the city, and efficiently discharge condensate, thereby improving fuel efficiency and driving performance of the fuel cell air mobility vehicle.

DETAILED DESCRIPTION

Reference is now made in detail to embodiments of the present disclosure, some embodiments of which are illustrated in the accompanying drawings. Wherever possible, the same reference numbers are used throughout the drawings to refer to the same or like parts, and a redundant description will be avoided.

A detailed description of well-known technology has not been given in describing embodiments of the disclosure lest it should obscure the subject matter of the embodiments. The attached drawings are provided to help the understanding of the embodiments of the present disclosure, not limiting the scope of the present disclosure. It is to be understood that the disclosure covers various modifications, equivalents, and/or alternatives falling within the scope and spirit of the present disclosure.

Although ordinal numbers such as "first," "second," and so forth are used to describe various components, those components are not limited herein. The terms are used only for distinguishing one component from another component.

The singular forms are intended to include the plural forms as well, unless the context clearly indicates otherwise. When a component, device, element, or the like of the present disclosure is described as having a purpose or performing an operation, function, or the like, the component, device, or element should be considered herein as being "configured to" meet that purpose or to perform that operation or function.

It should be further understood that the terms "comprises," or "includes", when used herein, specify the presence of stated features, integers, steps, operations, elements, components or combination thereof, but do not preclude the presence or addition of one or more other features, integers, steps, operations, elements, components, or combinations thereof.

Figure 1:
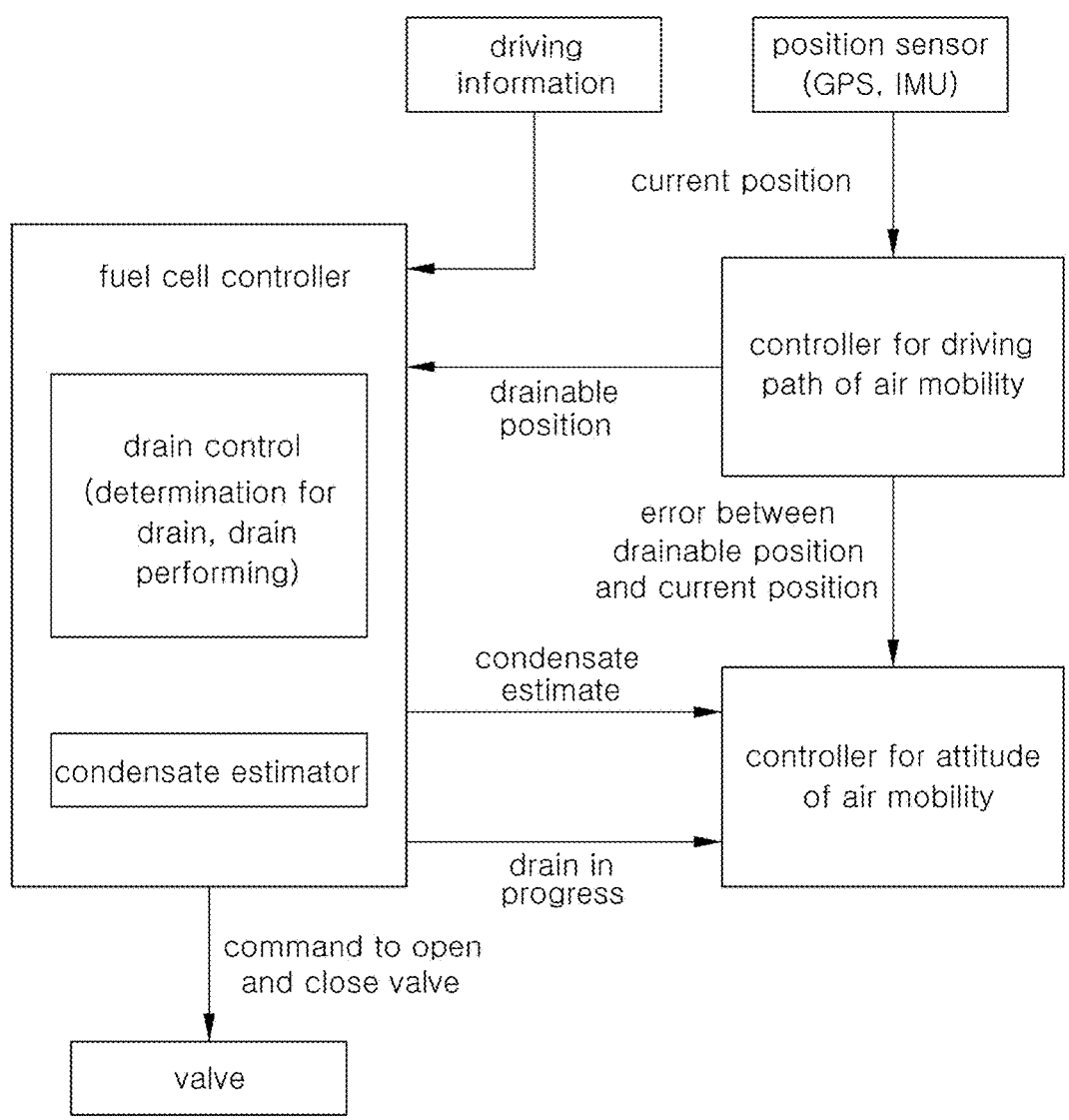
FIG. 1 is a system diagram of a fuel cell air mobility vehicle.

FIG. 1 is a system diagram of a fuel cell air mobility vehicle. The fuel cell air mobility vehicle may be an air mobility vehicle using a fuel cell as a main power source, or may be a drone used as an urban air mobility vehicle (UAM).

Referring to FIG. 1, condensate is accumulated in an air mobility vehicle using a fuel cell as a main power source as the air mobility vehicle flies. In other words, the condensate is produced while generating power in the fuel cell. The condensate accumulates inside the air mobility vehicle and causes a change in the center of gravity of the air mobility vehicle, so it is desirable to discharge it within a short period of time.

However, discharging the condensate may be limited due to difficult conditions for a place, an environment, a flight environment, etc. in which an air mobility vehicle can discharge the condensate.

Accordingly, in an environment in which condensate cannot be discharged, an appropriate attitude control of the air mobility vehicle is desired based on the increased weight due to the generated condensate, such that a controller capable of controlling the flight attitude of the air mobility vehicle is desired.

In addition, since the weight increase due to the continuous accumulation of condensate may reduce the fuel efficiency of a fuel cell, a driving route needs to be controlled to include a place where condensate can be properly discharged.

However, unlike the ground, due to the nature of the troposphere, where the air flow is very unstable, there are frequent situations in which unpredictable excessive power consumption occurs, and each driver who operates the air mobility vehicle has a different propensity, and power consumption may be excessive depending on a driving mode.

Accordingly, there is a need for a condensate drain method optimized for a fuel cell air mobility vehicle.

In one embodiment of the present disclosure, a fuel cell air mobility vehicle includes: a fuel cell stack 100 that provides power required for flight; a drain valve 200 that discharges condensate generated by power generation of the fuel cell stack 100 to an outside; and a controller 300 that controls opening and closing of the drain valve 200 based on at least one of a state of the power generation of the fuel cell stack 100, a flight state of the air mobility vehicle, a flight position of the air mobility vehicle, or a state of an external environment of the air mobility vehicle.

Figure 2:
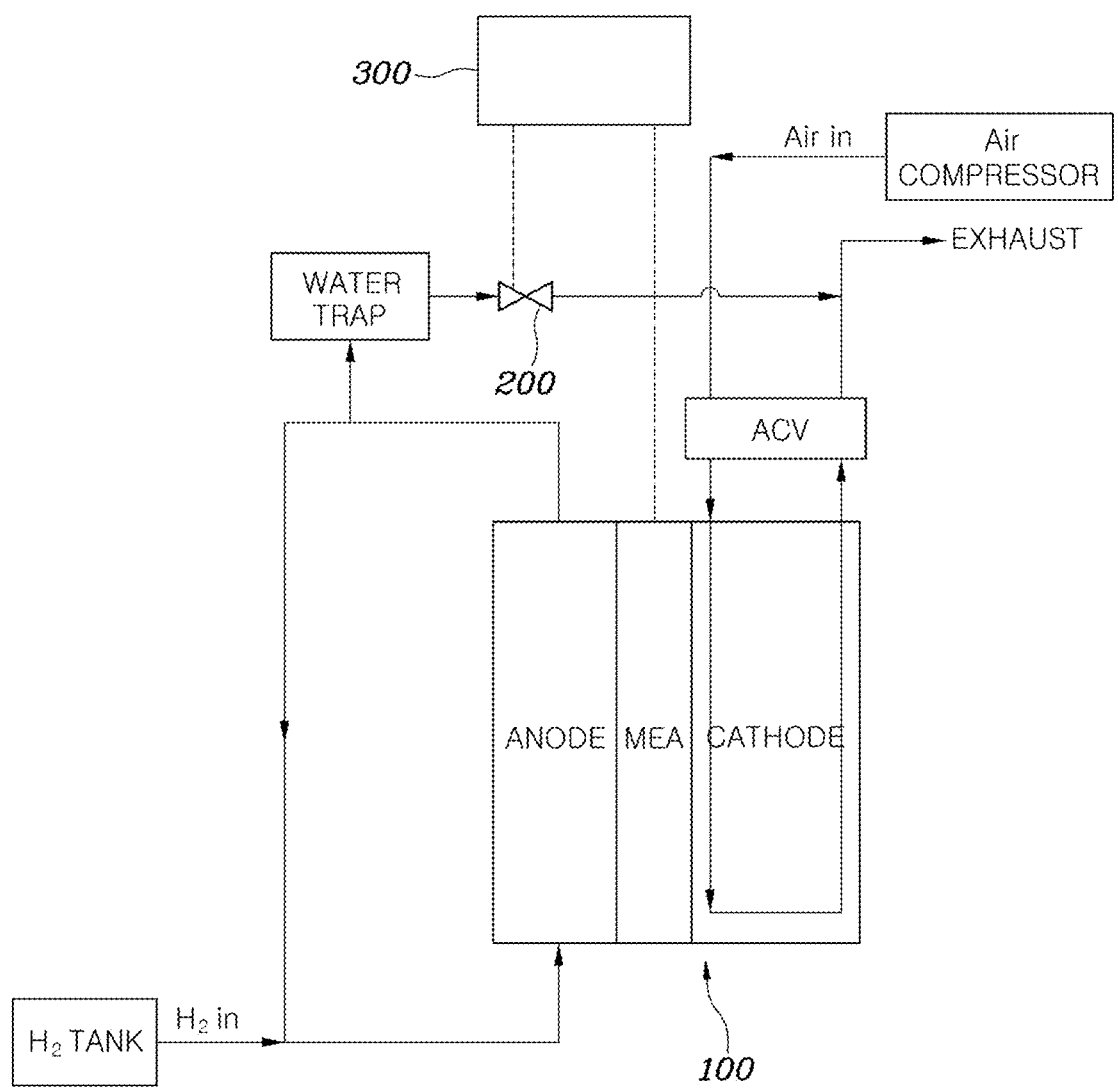
FIG. 2 is a schematic diagram of a fuel cell air mobility vehicle according to an embodiment of the disclosure.
Figure 3:
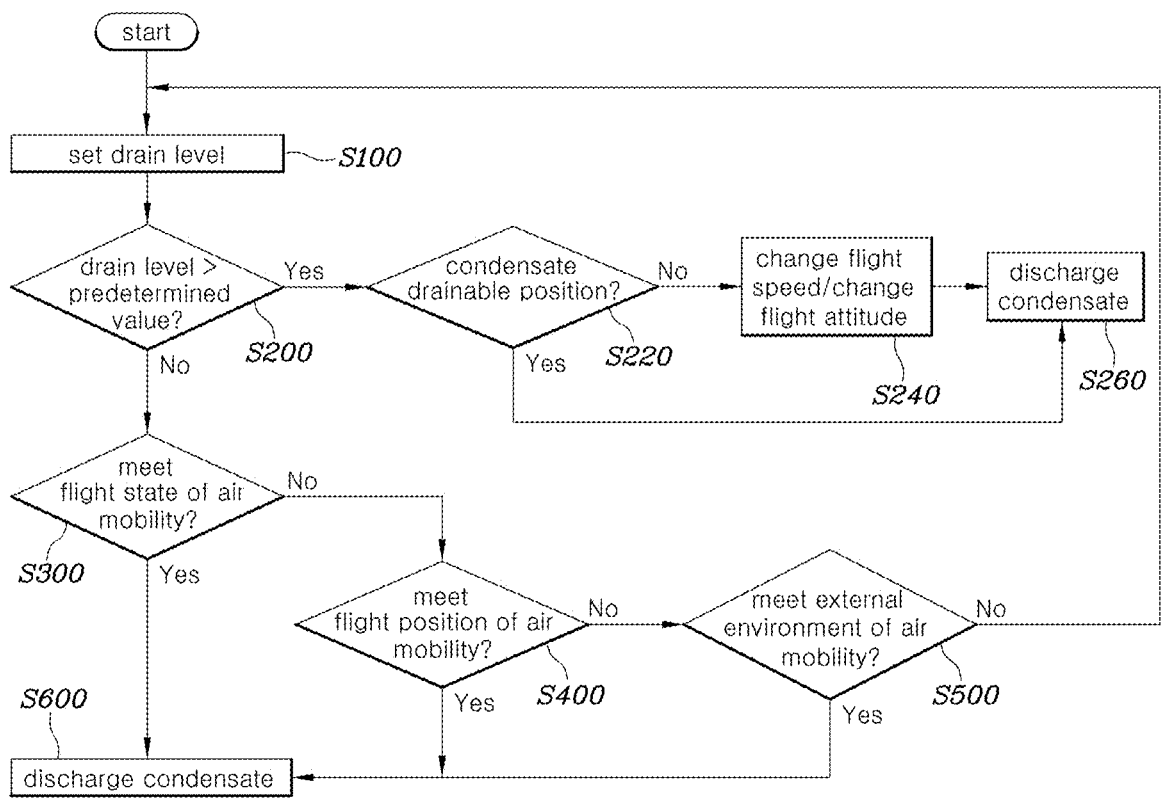
FIG. 3 is a flowchart of a control method of a fuel cell air mobility vehicle according to an embodiment of the disclosure.

FIG. 2 is a schematic diagram of a fuel cell air mobility vehicle according to an embodiment of the disclosure.

Referring to FIG. 2, the fuel cell stack 100 includes an anode, a cathode, and a membrane electrode assembly (MEA). Air is introduced into the cathode by an air compressor, and hydrogen is introduced into the anode from a hydrogen tank ($H_2$ tank). In this case, condensate is generated by a reaction, and the generated condensate is separated by a water trap at a side of the anode.

On the other hand, the water trap stores the separated condensate, and when a water level reaches a certain level, the drain valve 200 is opened to discharge the condensate to the outside together with the air discharged through the cathode.

In the case of a fuel cell vehicle, it is not a big issue even if condensate is discharged on the road while the vehicle is driving, but in the case of a fuel cell air mobility vehicle, when passing through the city (e.g., downtown areas), citizens living in the city may suffer damage from condensate drain, so the fuel cell air mobility vehicle cannot discharge the condensate at all times.

In addition, even if the driving route of the fuel cell air mobility vehicle is set in consideration of an area where drain is possible, a situation in which it is difficult to predict the high power consumption frequently occurs due to many disturbance factors such as turbulence in the sky, and the time for drain may be advanced.

Accordingly, the fuel cell air mobility vehicle according to the present disclosure controls the opening and closing of the drain valve 200 based on at least one of the state of the power generation of the fuel cell stack 100, the flight state of the air mobility vehicle, the flight position of the air mobility vehicle, or the state of the external environment of the air mobility vehicle, so as to enhance smooth discharge of condensate from the fuel cell air mobility vehicle.

In one embodiment, the controller may include a communication device configured to communicate with other controllers or sensors, a memory configured to store an operating system, a logic command, and input/output information, and one or more processors configured to perform determinations, calculations, and decisions desired for control of the inherent function.

Information about the state of the power generation of the fuel cell stack 100 includes an amount of condensate generated through the power generation of the fuel cell stack 100 or the consumption power of the fuel cell stack accessory (balance-of-plant (BoP)). The controller 300 may set a drain level through a factor according to an amount of condensate generated through the power generation of the stack 100 or the consumption power of accessary (BoP) of the fuel cell stack 100 (S100).

Specifically, referring to FIG. 2, the state of the power generation of the fuel cell stack 100 is proportional to the amount of condensate generated and proportional to the consumption power of the fuel cell stack accessary such as an air compressor.

Accordingly, the drain level may be set through a factor according to the amount of condensate or consumption power of an accessory. Thus, the drain level is a factor representing the amount of condensate, and a higher drain level may mean a state in which the condensate needs to be discharged to the outside.

The controller may divide the drain level into n steps.

For example, the drain level may be divided from step 0 to step 3 (total of 4 steps), and the drain level may be set by the sum of a factor by the amount of condensate and a factor by the consumption power of the fuel cell stack accessory.

In other words, if the factor by the amount of condensate is 1 and the factor by the consumption power of the fuel cell stack accessory is 1.3, the drain level may be set to 2. If the factor by the amount of condensate is 0.8, and the sum of the factors by the consumption power of the fuel cell stack accessory is 0.9, the drain level may be set to 1.

Meanwhile, the controller 300 may set the drain level by multiplying a factor according to a current flight mode of the air mobility vehicle by a factor according to the amount of condensate.

Specifically, the flight mode of the air mobility vehicle may include an ECO mode, a NORMAL mode, and a SPORT mode. For example, in the case of the NORMAL mode, the factor according to the flight mode may be set to 1.0, in the case of the ECO mode, the factor may be set to 0.8, and in the case of the SPORT mode, the factor may be set to 1.2.

In other words, the factor according to the flight mode is a factor that reflects the amount of condensate to be generated in the future. The higher power mode requires more condensate and has a higher factor value than that of the NORMAL mode, and the lower power mode generates less condensate and may have a factor value lower than that of the NORMAL mode.

Meanwhile. the controller 300 may determine an emergency situation if the set drain level is higher than or equal to a predetermined value and open the drain valve 200 to discharge the condensate to the outside.

Specifically, the controller 300 determines whether the drain level set by the factors according to the amount of condensate, the consumption power of a fuel cell stack accessory, and the flight mode is higher than or equal to a predetermined value (S200), and may determine a situation as an emergency situation that requires discharge of condensate in a short period of time in the case that the drain level is higher than or equal to a predetermined value.

In other words, the weight of the condensate greatly affects the maintenance of equilibrium and attitude control of the air mobility vehicle. Since the weight has a great influence on the stability of the air mobility vehicle in combination with the external environment, such as wind speed, the condensate may be discharged to the outside by opening the drain valve (S260) in the case that the discharge of condensate is desired.

For example, in the case that the drain level is 3 or more, it is determined as an emergency situation, and the drain valve 200 is opened to discharge the condensate to the outside (S260).

In this case, the controller 300 may change the flight speed or flight altitude for condensate drain (S240).

Specifically, if the condensate is immediately discharged even in an emergency situation where the condensate is drained, citizens in the city may be harmed. Therefore, the controller 300 determines whether the current flight position is a position where condensate discharge is possible (S220), and if it is determined that the condensate discharge is not possible, the controller 300 flies to a flight speed or flight altitude at which all the condensate can be scattered (S240), and then may discharge the condensate.

When the flight altitude is high enough or the flight speed is fast enough, all the condensate may be properly scattered and evaporated and may not reach the ground, so the controller 300 may select the most feasible condition among conditions in which all condensate can be scattered such as the flight speed and flight altitude conditions, and increase the flight speed or increase the flight altitude (S240).

On the other hand, the controller identifies the flight position of the air mobility vehicle (S220), and in the case that it is determined that the condensate may be discharged, the controller may discharge the condensate without changing the flight speed or flight altitude (S260).

If the set drain level is less than a predetermined value, the controller 300 may control opening and closing of the drain valve 200 in consideration of the drain level, the flight state of the air mobility vehicle, the flight position of the air mobility vehicle, or the state of the external environment of the air mobility vehicle.

Specifically, since condensate discharge is not required immediately in the case that the drain level is less than a predetermined value, the opening and closing of the drain valve 200 may be controlled in consideration of the flight state of the air mobility vehicle, the flight position of the air mobility vehicle, or the external environment of the air mobility vehicle.

In this case, if any one condition of the flight state of the air mobility vehicle (S300), the flight position of the air mobility vehicle (S400) and the external environment of the air mobility vehicle (S500) is met, the drain valve 200 may be opened to discharge the condensate.

Specifically, the flight state of the air mobility vehicle includes the speed of the air mobility vehicle or the flight altitude of the air mobility vehicle, and the controller 300 may control the opening and closing of the drain valve 200 through the drain level, the speed of the air mobility vehicle, or the flight altitude of the air mobility vehicle.

In other words, the controller 300 may determine whether the speed or altitude of the air mobility vehicle is higher than or equal to a predetermined value (S300). If the speed of the air mobility vehicle is higher than or equal to a predetermined speed, it is determined that all the condensate may be scattered even if the condensate is discharged, and the drain valve may be opened to discharge the condensate (S600).

In addition, in the case that the altitude of the air mobility vehicle is higher or equal to than a predetermined altitude, it is determined that all the condensate may be scattered even if the condensate is discharged, and the drain valve may be opened to discharge the condensate (S600).

In addition, in the case that the speed of the air mobility vehicle is not higher than or equal to a predetermined speed and the altitude of the air mobility vehicle is not higher than or equal to a predetermined altitude, but it is determined that all the condensate may be scattered even if the condensate is discharged depending on the temperature condition outside the air mobility vehicle, the drain valve may be opened to discharge the condensate (S600).

In this case, the condensate may be discharged to the outside by opening the drain valve regardless of the flight position of the air mobility vehicle or the state of the external environment of the air mobility vehicle (S600).

On the other hand, the flight position of the air mobility vehicle includes a position where condensate may be discharged to the outside. In the case that it is determined that the condensate may be discharged to the outside and the discharge time according to the amount of condensate is shorter than the time to leave the position where condensate may be discharged to the outside, the controller may open the drain valve to discharge the condensate to the outside (S400).

Specifically, the controller determines whether the current flight position of the air mobility vehicle is a position where the condensate may be discharged to the outside, but the time to discharge the condensate is longer than the time to leave the position where the condensate may be discharged to the outside (S400).

In the case that the time to discharge the condensate is longer than the time to leave the position where the condensate may be discharged to the outside, the condensate is not discharged to the outside or the condensate is discharged only as much as the time to leave the position where the condensate may be discharge to the outside (S600).

On the other hand, in the case that the discharge time according to the amount of condensate is shorter than the time to leave the position where the condensate may be discharged to the outside, the drain valve may be opened to discharge the condensate to the outside (S600).

In this case, the condensate may be discharged regardless of the flight condition of the air mobility vehicle or the external environment.

Meanwhile, the state of the external environment of the air mobility vehicle includes whether there is precipitation outside the air mobility vehicle. In this case, the controller determines whether it is in a state such as snowfall or rain outside the air mobility vehicle (S500). If it is determined that it is currently snowing or raining, the condensate may be discharged to the outside by opening the drain valve 200 regardless of the flight state of the air mobility vehicle or the flight position of the air mobility vehicle.

Although the disclosure has been shown and described with respect to specific embodiments, it will be obvious to those skilled in the art that the disclosure may be variously modified and altered without departing from the spirit and scope of the present disclosure.

DESCRIPTION OF REFERENCE NUMERALS

100: fuel cell stack
200: drain valve
300: controller

What is claimed is:
1. An air mobility vehicle comprising:
   a fuel cell stack configured to supply power for flight of the air mobility vehicle;
   a drain valve configured to discharge condensate generated through power generation of the fuel cell stack to an outside; and
   a controller configured to;

set a drain level based on a state of the power generation of the fuel cell stack or a flight state of the air mobility vehicle, and control a degree of opening of the drain valve to discharge the condensate to the outside, based on the drain level and on at least one of: a flight position of the air mobility vehicle; or a state of an external environment of the air mobility vehicle.

2. The fuel cell air mobility vehicle of claim 1, wherein the state of the power generation of the fuel cell stack includes an amount of the condensate generated by the power generation of the fuel cell stack or a power consumption of a fuel cell stack accessary (BoP).

3. The fuel cell air mobility vehicle of claim 1, wherein the controller is configured to divide the drain level into n steps.

4. The fuel cell air mobility vehicle of claim 3, wherein the controller is configured to increase an amount of the condensate discharged by increasing the degree of opening of the drain valve as the drain level increases.

5. The fuel cell air mobility vehicle of claim 1, wherein the controller is configured to set the drain level by multiplying a factor according to a current flight mode of the air mobility vehicle with a factor according to an amount of the condensate.

6. The fuel cell air mobility vehicle of claim 1, wherein the controller is configured to determine an emergency situation when the set drain level is higher than or equal to a predetermined value and configured to open the drain valve to discharge the condensate to the outside.

7. The fuel cell air mobility vehicle of claim 6, wherein when the emergency situation is determined, the controller is configured to change a flight speed or flight altitude for drain of the condensate.

8. The fuel cell air mobility vehicle of claim 1, wherein the controller is configured to control the opening and closing of the drain valve based on the drain level, the flight position of the air mobility vehicle, and the state of the external environment of the air mobility vehicle when the set drain level is less than a predetermined value.

9. The fuel cell air mobility vehicle of claim 1, wherein the flight state of the air mobility vehicle includes a speed of the air mobility vehicle or a flight altitude of the air mobility vehicle, and the controller is configured to control the degree of opening of the drain valve based on the drain level, the speed of the air mobility vehicle or the flight altitude of the air mobility vehicle.

10. The fuel cell air mobility vehicle of claim 9, wherein when the speed of the air mobility vehicle or the flight altitude of the air mobility vehicle is higher than or equal to a predetermined value, the drain valve is opened to discharge the condensate to the outside regardless of the flight position of the air mobility vehicle or the state of the external environment of the air mobility vehicle.

11. The fuel cell air mobility vehicle of claim 1, wherein the state of the external environment of the air mobility vehicle includes whether or not there is precipitation outside the air mobility vehicle, and when the controller determines that there is the precipitation outside the air mobility vehicle, the controller is configured to open the drain valve to discharge the condensate to the outside regardless of the flight state of the air mobility vehicle or the flight position of the air mobility vehicle.

12. The fuel cell air mobility vehicle of claim 1, wherein the flight position of the air mobility vehicle includes a position where the condensate is able to be discharged to the outside, and when a current position of the air mobility vehicle is determined as a position where the condensate is able to be discharged to the outside and when a discharge time according to an amount of condensate is shorter than a time to leave the position where the condensate is able to be discharged, the controller is configured to open the drain valve to discharge the condensate to the outside.

13. A method for controlling a fuel cell air mobility vehicle, comprising:
  identifying, by a controller, a state of power generation of a fuel cell stack of the fuel cell air mobility vehicle;
  identifying, by the controller, a flight state of the air mobility vehicle;
  identifying, by the controller, a flight position of the air mobility vehicle;
  identifying, by the controller, a state of external environment of the air mobility vehicle;
  setting, by the controller, a drain level based on the state of power generation of the fuel cell stack or the flight state of the air mobility vehicle; and
  controlling, by the controller, a degree of opening of a drain valve to discharge condensate to an outside, based on the drain level and on at least one of: the flight position of the air mobility vehicle; or the state of the external environment of the air mobility vehicle.

* * * * *